United States Patent

Panovsky et al.

[11] Patent Number: 5,913,661
[45] Date of Patent: Jun. 22, 1999

[54] STRIATED HYBRID BLADE

[75] Inventors: Josef Panovsky, Hamilton; Joseph T. Stevenson, Amelia, both of Ohio

[73] Assignee: General Electric Company, Cincinnati, Ohio

[21] Appl. No.: 08/995,979

[22] Filed: Dec. 22, 1997

[51] Int. Cl.$^6$ ................................... B63H 1/26
[52] U.S. Cl. .................. 416/229 A; 416/229 R; 416/241 A; 416/224; 416/144; 416/145; 416/500; 415/119
[58] Field of Search .................. 416/229 R, 229 A, 416/241 A, 224, 144, 145, 500; 415/119

[56] References Cited

U.S. PATENT DOCUMENTS

| | | | |
|---|---|---|---|
| 2,412,615 | 12/1946 | Howard | 416/500 |
| 2,933,286 | 4/1960 | Klint et al. | |
| 3,294,366 | 12/1966 | Coplin | |
| 3,796,513 | 3/1974 | Jonas | 416/224 |
| 4,118,147 | 10/1978 | Ellis | 416/230 |
| 4,178,667 | 12/1979 | Stevens et al. | 29/156 |
| 5,295,789 | 3/1994 | Daguet | 416/241 A |
| 5,634,771 | 6/1997 | Howard et al. | 416/241 A |
| 5,655,883 | 8/1997 | Schilling | 416/229 A |

FOREIGN PATENT DOCUMENTS

| | | |
|---|---|---|
| 2695163 | 3/1994 | France . |
| 1628355 | 4/1965 | Germany . |

OTHER PUBLICATIONS (Docket RD–24978) Patent application Serial No. 08/650,278, filed May 20, 1996.
(Docket RD–24735) Patent application Serial No. 08/593,757, filed Jan. 29, 1996.
(Docket RD–25135) Patent application Serial No. 08/837,880, filed Apr. 25, 1997.

*Primary Examiner*—F. Daniel Lopez
*Assistant Examiner*—Ninh Nguyen
*Attorney, Agent, or Firm*—Andrew C. Hess; Rodney M. Young

[57] ABSTRACT

A fan blade includes a metal airfoil having first and second opposite sides extending longitudinally between a root and a tip, and laterally between a leading edge and a trailing edge. The airfoil further includes a plurality of fine striations spaced laterally apart between the leading and trailing edges in the airfoil first side, and extending longitudinally between the root and the tip. A viscoelastic filler is bonded in the striations for damping torsional vibrations of the airfoil.

10 Claims, 2 Drawing Sheets

STRIATED HYBRID BLADE

BACKGROUND OF THE INVENTION

The present invention relates generally to gas turbine engines, and, more specifically, to wide chord fan blades therein.

A turbofan gas turbine engine includes a row of fan blades powered by a low pressure turbine (LPT). Air initially enters the engine through the fan and an inner portion thereof enters a compressor which pressurizes the air for mixing with fuel in a combustor and ignited for generating hot combustion gases which flow downstream through a high pressure turbine (HPT) which extracts energy for powering the compressor. The combustion gases then flow through the LPT which extracts additional energy therefrom for powering the fan. The remaining outer portion of the air flowing through the fan is discharged from the engine for producing thrust to power an aircraft in flight.

A fan blade includes a dovetail at its radially inner end which is trapped in a complementary dovetail slot in the perimeter of a rotor disk. An airfoil is attached to the dovetail by a structural shank. Platforms may be joined integrally with the blade or separately attached between adjacent blades for providing a radially inner flowpath boundary for the fan air, with the platform being radially located atop the shank at a radially inner root of the airfoil.

The airfoil extends radially outwardly to an opposite tip, and has a forward or leading edge and an axially opposite aft or trailing edge collectively defining the perimeter of the airfoil. The airfoil has a generally concave or pressure first side and a circumferentially opposite convex or suction second side. The airfoil has a span or longitudinal axis extending in the radial direction from the centerline of the rotor disk to which it is attached, and various chords extending generally axially between the leading to trailing edges. The airfoil typically twists from its root to its tip for maximizing aerodynamic performance.

Wide chord fan blades have a relatively low aspect ratio which is its span to chord ratio and are relatively heavy when formed as solid metal parts. Weight reduction is typically obtained by using high strength superalloy materials such as those including Titanium. However, as engines grow larger in size the corresponding fan blades increase in size and weight, and increase the difficulty in achieving a suitable life therefor under the high centrifugal loads generated during operation.

In separate developments, all composite fan blades have been designed for reducing weight while providing acceptable performance in the gas turbine engine environment. A typical composite blade includes several layers of structural fibers, such as graphite, embedded in a suitable matrix, such as epoxy, for tailoring blade strength in a lightweight structure. Composite blades require a complex manufacturing process and are expensive to produce.

Hybrid blades are also being developed which are primarily metal, such as Titanium, having suitable pockets therein for reducing weight, with the pockets being filled with a suitable filler material for completing the required aerodynamic profile of the airfoil. However, pockets in an otherwise structural airfoil reduce the stiffness thereof, or the corresponding moments of inertia, and thus create an additional problem in vibratory performance and foreign object damage (FOD) resistance.

More specifically, during operation a fan blade is subject to centrifugal force, aerodynamic force, and vibratory stimuli due to the rotation of the fan blades over the various operating speeds of the engine. A fan blade has various modes of resonant vibration due to the various excitation forces occurring during engine operation. A fan blade is basically cantilevered from its rotor disk and therefore may bend or flex generally in the circumferential direction in fundamental and higher order modes of flexure or flex. The airfoil is also subject to fundamental and higher order torsional modes of vibration which occur by twisting around the airfoil span axis. The flex and torsion modes of vibration may also be coupled together further increasing the difficulty of blade design.

Hybrid blades which include weight lightening pockets therein are also subject to local panel modes of vibration due to the remaining thin metal at the base of the pockets which may separately vibrate. In addition to these various modes of vibration of the individual blades, the full row of blades on a rotor disk may vibrate collectively in group modes.

Although hybrid blades being developed allow a substantial reduction in blade weight, the open ended pockets therein necessarily decrease both the bending and torsional stiffnesses, or moments of inertia, of the airfoil which adversely affects the various vibration modes. For example, the pockets reduce bending stiffness and may correspondingly lower the resonant frequency of the fundamental flex mode. This in turn decreases the frequency margin between the fundamental blade vibratory mode and the conventional 1/rev fundamental excitation frequency of the engine. The smaller the frequency margin, the greater is the excitation response and resulting vibratory displacement and stress, which may be reduced by suitable damping. The pockets also decrease the torsional stiffness of the blade which leads to reduction in frequency margin between torsion modes and adjacent flex modes, for example. This too may lead to undesirable blade excitation during operation from aerodynamic excitation forces.

The filler material is preferably viscoelastic for introducing damping to reduce vibratory response of the airfoil during engine operation. However, relatively large pockets in the airfoil do not promote significant shear strain in the filler since loads are carried therearound in the metal portions. This is especially significant for the torsional modes which effect a different response pattern than the flex modes.

Furthermore, since the fan blades are the first rotating structure in a gas turbine engine which receives intake air, they are also subject to foreign object damage (FOD), due to birds strike for example. Typical fan blades are therefore also designed to have suitable FOD strength, with flexibility at the leading edge region of the blade for withstanding a bird strike with little or no permanent damage thereto. The pockets being developed for hybrid blades necessarily decrease the stiffness of the airfoil aft of the leading edge thusly decreasing the ability of the airfoil to withstand foreign object damage.

Accordingly, it is desired to provide a hybrid fan blade having improved damping and FOD resistance.

SUMMARY OF THE INVENTION

A fan blade includes a metal airfoil having first and second opposite sides extending longitudinally between a root and a tip, and laterally between a leading edge and a trailing edge. The airfoil further includes a plurality of fine striations spaced laterally apart between the leading and trailing edges in the airfoil first side, and extending longitudinally between the root and the tip. A viscoelastic filler is bonded in the striations for damping torsional vibrations of the airfoil.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
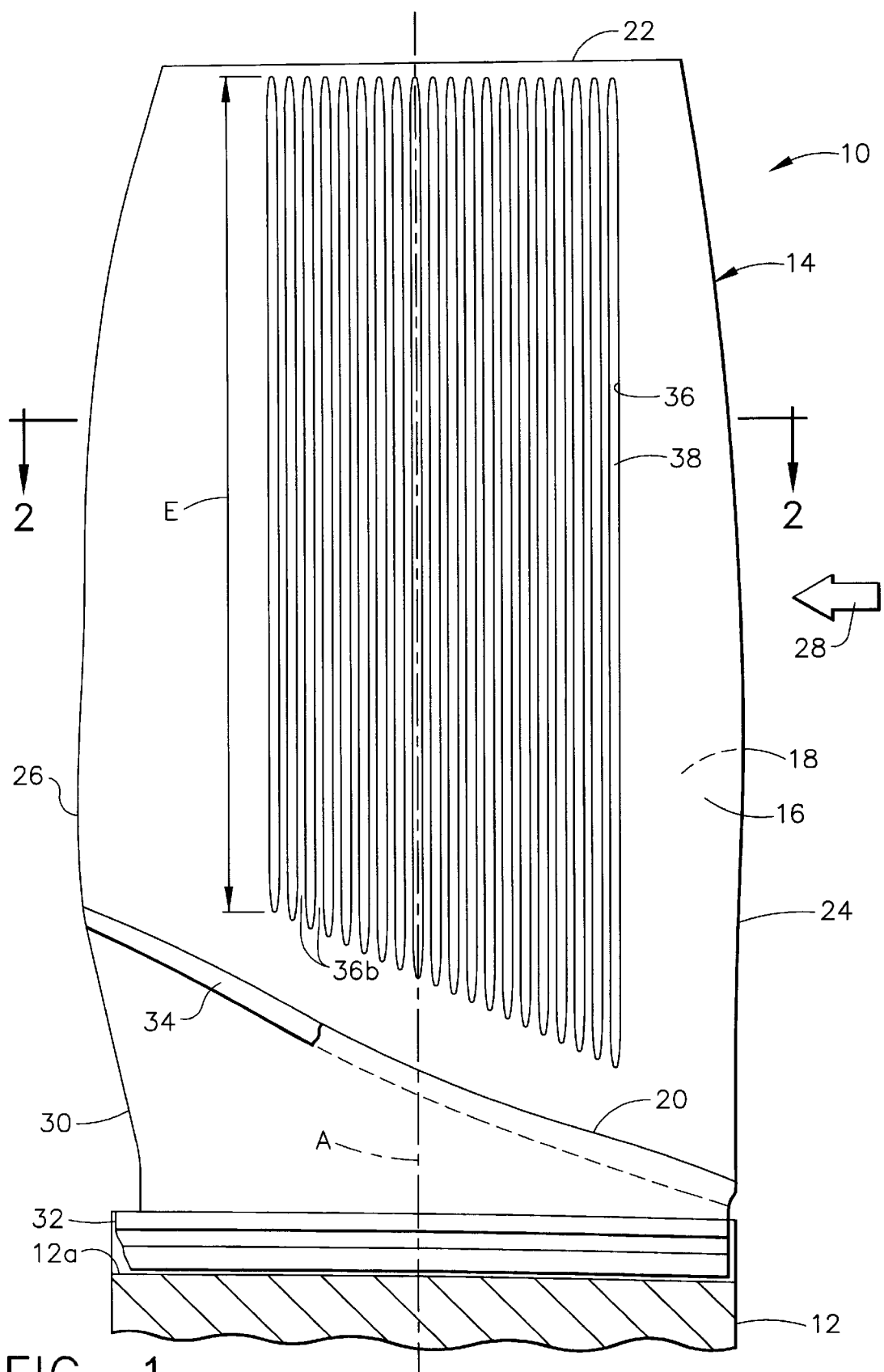
FIG. 1 is an elevational view of an exemplary gas turbine engine hybrid fan blade striated in accordance with an exemplary embodiment of the present invention.

Illustrated in FIG. 1 is one of several exemplary gas turbine engine fan rotor blades 10 mounted to the perimeter of a rotor disk 12 shown in part. In accordance with the present invention, the blade 10 is configured as a hybrid blade including a metal airfoil 14 having a first or pressure side 16 which is generally concave, and a circumferentially opposite second or suction side 18 which is generally convex. The first and second sides or surfaces 16,18 extend radially along the span or longitudinal axis A of the airfoil 14 between a radially inner root 20 and an opposite radially outer tip 22.

The first and second sides also extend axially or laterally along the chord of the airfoil between a forward or leading edge 24 of the airfoil and an axially opposite aft or trailing edge 26. Ambient air 28 flows over the two airfoil sides from the leading edge to the trailing edge during operation and is pressurized by the airfoil in a conventional manner for producing propulsion thrust during operation for powering an aircraft in flight.

Although the airfoil 14 may be integrally or directly mounted to the rotor disk 12 in a one piece assembly known as a blisk, in the exemplary embodiment illustrated in FIG. 1 each of the airfoils 14 is removably attached to the disk 12 in a conventional manner. More specifically, the blade 10 further includes an integral metal shank 30 joined integrally with the airfoil root 20 for mounting the blade to the rotor disk 12. This is effected using a conventional metal dovetail 32 joined integrally with the shank 30 for mounting the blade in a complementary dovetail slot 12a in the rotor disk. The airfoil 14, shank 30, and dovetail 32 may initially be formed as a one-piece or unitary metal structure such as by forging. A suitable metal for the fan blade 10 is Titanium, for example.

The dovetail 32 is typically an axial-entry dovetail which is captured in a complementary axial dovetail slot 12a in the perimeter of the rotor disk 12. The shank 30 provides a structural transition from the dovetail 32 to the aerodynamic airfoil 14, and is typically not an aerodynamic member itself. The shank 30 is typically hidden from the airflow 28 by a suitable flow bounding platform 34 (shown in part) disposed at the airfoil root 20 either integrally therewith or as separately mounted platforms between adjacent ones of the blades 10 in a conventional manner.

In accordance with a preferred embodiment of the present invention, the airfoil 14 further includes a plurality of fine striations 36 spaced laterally apart between the leading and trailing edges 24,26 in the airfoil first side 16, which extend radially or longitudinally between the root 20 and the tip 22. A viscoelastic filler material 38 is suitably bonded in the striations 36 for damping primarily torsional vibration of the airfoil 14 during operation.

Figure 2:
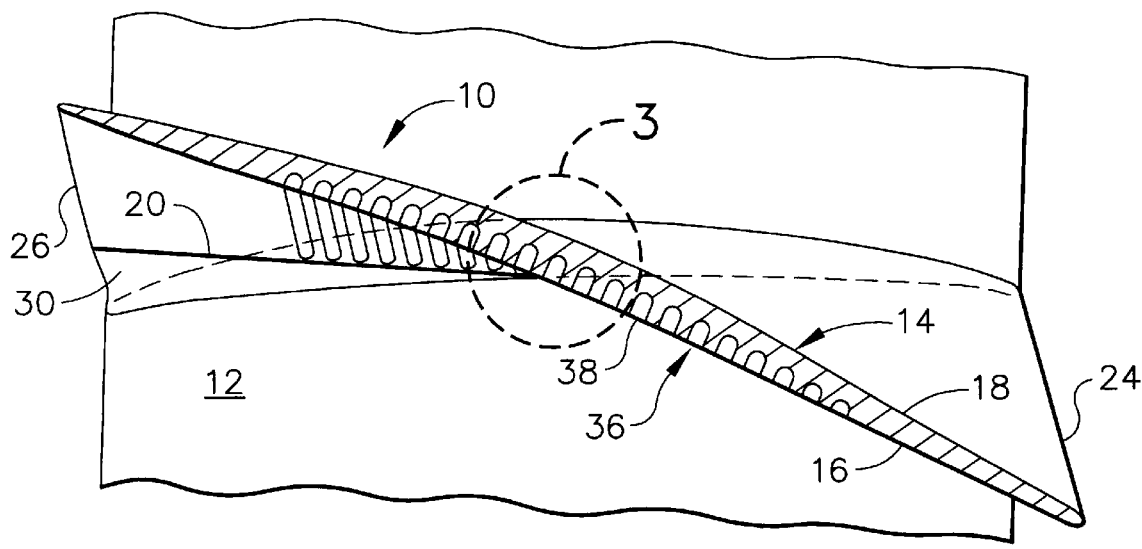
FIG. 2 is a radial sectional view through a mid-span portion of the airfoil illustrated in FIG. 1 taken along line 2—2.
Figure 3:
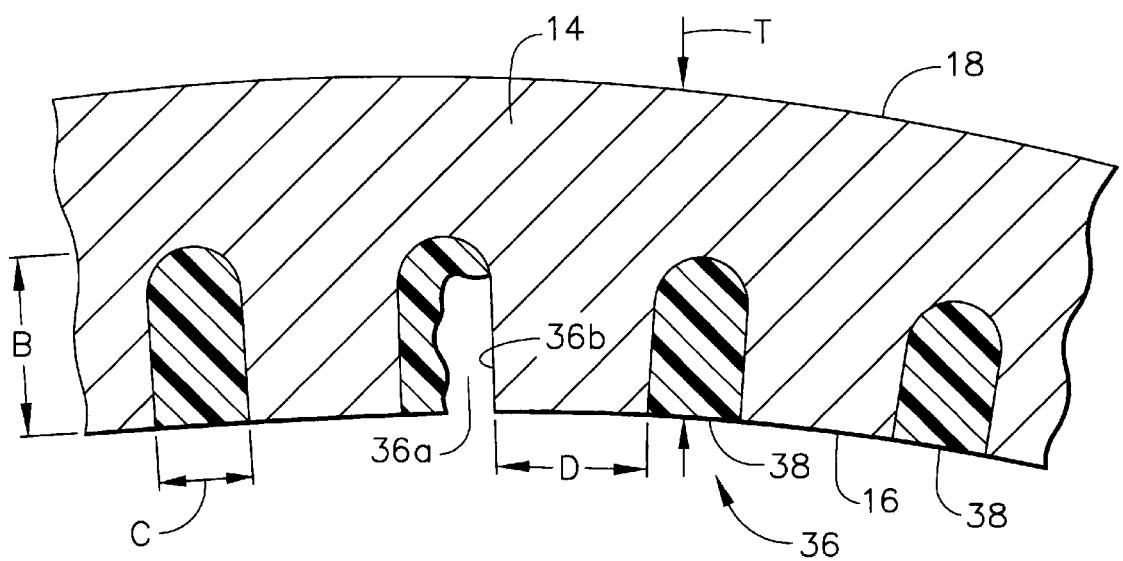
FIG. 3 is an enlarged sectional view through the airfoil portion of the blade illustrated in FIG. 2 within the dasher circle labeled 3.

The striations 36 and filler 38 are illustrated in more particularity in FIGS. 2 and 3. The fine striations 36, or alternatively crenulations, define longitudinally or radially extending grooves 36a, as shown in FIG. 3, which extend transversely in depth B in the airfoil first side 16 toward the airfoil second side 18. The grooves 36a are separated laterally or axially by corresponding ribs 36b which extend longitudinally or radially between the root 20 and the tip 22 as illustrated in FIG. 1.

The striations 36 are specifically sized and configured in accordance with the present invention for placing the viscoelastic filler 38 in a location where it will be subjected to maximum shear strains generated by the torsional modes of vibration of the airfoil so that maximum damping thereof may be effected. As shown in FIG. 3, both the grooves 36a and corresponding ribs 36b are laterally thin for reducing weight and maximizing shear strain in the filler 38 and maximizing damping of torsional vibration of the airfoil 14.

Since shear strain due to bending or torsion are different, the striations 36 must be preferentially sized and configured to maximize shear strain in the filler 38 during the torsional modes as opposed to the bending mode. Torsional vibration of the airfoil 14 effects oscillatory twisting of the airfoil around the longitudinal axis A illustrated in FIG. 1. The corresponding shear strains developed by torsion are maximum along the outer surface of the airfoil 14 as opposed to the inner or center regions thereof. The grooves 36a illustrated in FIG. 3 therefore preferably extend only in part through the airfoil up to about mid-thickness thereof for maximizing torsion generated shear strain in the filler 38. The depth B of the individual grooves 36a may vary as desired up to about half of the airfoil thickness for maximizing damping effectiveness.

The grooves 36a and ribs 36b are relatively thin as compared to the maximum thickness T of the airfoil 14 at each radial section to ensure that torsional shear strain is effected in each of the ribs 36b for correspondingly deforming the filler 38 to effect damping. If the grooves 36a are excessively wide, the adjacent ribs will not effectively induce shear strain in the filler.

As shown in FIG. 3, the individual grooves 36a have a width C and extend in depth B to a suitable fillet radius at the base thereof for reducing stress concentration. In a preferred embodiment, the width C of each groove 36a is made as small as practical, or minimized, for maximizing the shear strain developed between adjacent ribs 36b for having maximum damping effect on the filler 38 bonded in the grooves 36a. The groove width C is preferably substantially less than the thickness T of the corresponding airfoil sections for suitable thinness. For example, the groove width C may be in the range of T/2 to T/10.

The width D of the ribs 36b is also relatively small, and generally greater than or equal to the width C of the groove 36a for maximizing the number of grooves 36a and filler 38 therein, with a suitable number of ribs 36b for effectively carrying torsion loads in shear during operation. The rib width D is also preferably less than the thickness T of the corresponding airfoil sections for suitable thinness, and for example may be about T/2. The pairs of thin grooves 36a and ribs 36b therefore collectively define correspondingly fine striations 36 whose pair width is also preferably less than the thickness T of the airfoil sections.

Any suitable viscoelastic filler material 38 may be used in the grooves 36a and may be suitably molded and heat cured therein to complete the desired aerodynamic profile of the airfoil 14 along the first side 16 thereof. The filler 38 may be a suitable rubber material bonded in the grooves using a suitable adhesive such as an epoxy adhesive designated 2216 under the Scotch Weld trade name available from the 3M Company of Minnesota.

As illustrated in FIGS. 1 and 2, the striations 36 are preferably disposed solely in the mid-chord region of the airfoil 14 and spaced laterally from both leading and trailing edges 24,26 to most effectively position the ribs 36b and filler 38 in the region subject to highest shear strain during torsional vibration. The striations 36 preferably terminate below the airfoil tip 22 and above the airfoil root 20 so that a continuous perimeter of metal remains around the striation group in the airfoil first side 16.

The striations 36 illustrated in FIG. 1 preferably cover the airfoil first side 16 laterally between the leading and trailing edges 24,26 and longitudinally between the root 20 and the tip 22 in a generally rectangular profile or array for maximizing torsional shear strain in the filler 38. Since the striations 36 are therefore placed in the region of the airfoil mid-chord, the leading and trailing edges remain solid metal for a significant axial extent for maintaining effective strength and resistance against foreign object damage due to bird strikes for example. The striations 36 include relatively shallow grooves within the thicker mid-chord region of the airfoil 14 which maintains substantial structural integrity of the airfoil 14 while providing enhanced torsional damping thereof.

The grooves 36a are filled with low density filler 38 and effectively reduce the overall weight of the higher density metal airfoil 14, which in turn reduces the centrifugal loads which must be accommodated by the airfoil 18 during operation. A significant weight saving may be obtained with the striations 36 while integrating significant amounts of damping.

Each of the striations 36 as illustrated in FIG. 1 has a corresponding length E which may be selected as desired for the specific mode shape being damped. For example, the striations 36 are preferably parallel to each other, and are continuous between the root 20 and the tip 22 over their entire length E without interruption or discontinuity in the grooves 36a and ribs 36b thereof. The striations 36 are also preferably substantially parallel to the leading and trailing edges 24,26 for being disposed in the generally radial direction relative to the centerline axis of the rotor disk 12. In this way, the grooves 36a do not introduce significant stress concentrations under the substantial centrifugal forces generated during operation which act along the radial or longitudinal axis of the airfoil.

In this preferred embodiment, the radially oriented ribs 36b experience relative radial elastic deformation or strain between the ribs during torsional vibratory response of the airfoil 14 for generating significant shear strain in the filler 38, which in turn maximizes the damping effectiveness of the filler 38 under such strain.

The striations 36 are preferably disposed in the airfoil first side 16 which is generally concave, which therefore maximizes the resulting strength and bending moments of inertia of the airfoil sections. Alternatively, the striations 36 may be disposed in the airfoil convex second side 18 if desired for specific applications.

Although the striations 36 are illustrated in the preferred embodiment in primarily only a radial orientation along the airfoil 14, the angular orientation thereof may be varied as desired for further maximizing effective damping of the airfoil in torsion modes in particular. Alternatively, the orientation of the striations 36 may be varied to maximize damping for other modes of vibration as desired. The number of grooves, width of the grooves and ribs, and radial extent of the grooves may also be varied to optimize the damping for a particular blade design. Although the specific configuration of the striations 36 illustrated in FIG. 1 enhance effective damping in torsional modes of vibration, damping may also be effected for other modes of vibration including flexural modes. For example, the airfoil 14 is also subject to stripe modes of vibration having two or more nodal lines, effectively dampened by the striations 36.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

We claim:

1. A gas turbine engine fan blade comprising:

a metal airfoil having first and second opposite sides extending longitudinally between a root and a tip, and laterally between a leading edge and a trailing edge for pressurizing air channeled thereover;

a plurality of fine striations spaced apart between said leading and trailing edges in said airfoil first side, and extending between said root and said tip; and a viscoelastic filler bonded in said striations for damping vibration of said airfoil.

2. A blade according to claim 1 wherein said striations define grooves extending transversely into said airfoil first side toward said airfoil second side, and separated laterally by corresponding ribs.

3. A blade according to claim 2 wherein said grooves are laterally thin for maximizing shear strain in said filler for damping said airfoil vibration.

4. A blade according to claim 3 wherein said grooves extend only in part through said airfoil up to about mid-thickness thereof.

5. A blade according to claim 4 wherein said striations are disposed solely in a mid-chord region of said airfoil spaced laterally from both said leading and trailing edges.

6. A blade according to claim 5 wherein said striations extend longitudinally and terminate below said airfoil tip and above said airfoil root.

7. A blade according to claim 4 wherein said striations are parallel to each other and continuous between said root and said tip.

8. A blade according to claim 7 wherein said striations are substantially parallel to said leading and trailing edges.

9. A blade according to claim 8 wherein said striations cover said airfoil first side laterally between said leading and trailing edges and longitudinally between said root and tip in a rectangular array for maximizing shear strain in said filler for damping torsional vibration of said airfoil.

10. A blade according to claim 4 wherein said airfoil first side is generally concave.

* * * * *